US008965147B2

(12) United States Patent
Homa et al.

(10) Patent No.: US 8,965,147 B2
(45) Date of Patent: Feb. 24, 2015

(54) BEND INSENSITIVE OPTICAL FIBER WITH IMPROVED HYDROGEN RESISTANCE

(75) Inventors: Daniel Homa, Blacksburg, VA (US); Brooks Childers, Christianburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 973 days.

(21) Appl. No.: 12/634,296

(22) Filed: Dec. 9, 2009

(65) Prior Publication Data

US 2011/0135246 A1 Jun. 9, 2011

(51) Int. Cl.
*G02B 6/00* (2006.01)
*G02B 6/02* (2006.01)
*G02B 6/036* (2006.01)
*G01D 5/353* (2006.01)
*G01K 11/32* (2006.01)
*G02B 6/293* (2006.01)

(52) U.S. Cl.
CPC .......... *G02B 6/03627* (2013.01); *G01D 5/3538* (2013.01); *G01K 11/3206* (2013.01); *G02B 6/29319* (2013.01)
USPC ............. 385/12; 385/123; 385/126; 385/128; 385/141

(58) Field of Classification Search
CPC ... G02B 6/02; G02B 6/02057; G02B 6/02076
USPC ........... 385/123, 126, 127, 128, 130, 141, 12, 385/100; 367/25, 64, 69
See application file for complete search history.

(56) References Cited

U.S. PATENT DOCUMENTS

| 4,167,305 | A |   | 9/1979  | Ichiba et al. |
|-----------|---|---|---------|---------------|
| 4,756,599 | A |   | 7/1988  | Maeda et al. |
| 4,842,369 | A |   | 6/1989  | Teshima et al. |
| 5,123,076 | A |   | 6/1992  | Nishimoto et al. |
| 5,291,501 | A |   | 3/1994  | Hanna |
| 5,841,529 | A |   | 11/1998 | Sirkis et al. |
| 5,857,053 | A | * | 1/1999  | Kane ............................ 385/127 |
| 6,009,222 | A |   | 12/1999 | Dong et al. |
| 6,771,865 | B2 |  | 8/2004  | Blaszyk et al. |
| 6,904,219 | B1 | * | 6/2005  | Fermann ....................... 385/130 |
| 6,947,650 | B1 |  | 9/2005  | Homa |
| 7,324,714 | B1 |  | 1/2008  | Cranch et al. |
| 7,526,160 | B1 |  | 4/2009  | Homa et al. |

(Continued)

FOREIGN PATENT DOCUMENTS

JP    2003195066      7/2003
WO   2006107277 A1   10/2006

OTHER PUBLICATIONS

Notification of Transmittal of the International Search Report and the Written Opinion of the International Searching Authority, or the Declaration; PCT/US2010/059507 Aug. 23, 2011.

(Continued)

*Primary Examiner* — Charlie Peng
*Assistant Examiner* — Mary El Shammaa
(74) *Attorney, Agent, or Firm* — Cantor Colburn LLP (57) ABSTRACT

An optical fiber includes: a core including a photosensitive material disposed therein, the core having a first index of refraction; a depressed cladding surrounding the core and having a second index of refraction that is lower than the first index of refraction; and an outer cladding surrounding the depressed cladding and having a third index of refraction that is higher than the depressed cladding.

18 Claims, 5 Drawing Sheets

(56) References Cited

U.S. PATENT DOCUMENTS

| | | |
|---|---|---|
| 2001/0026362 A1 | 10/2001 | Gleine et al. |
| 2002/0154875 A1* | 10/2002 | Sasaoka et al. ............... 385/123 |
| 2002/0172470 A1 | 11/2002 | Johnson et al. |
| 2002/0197037 A1 | 12/2002 | Bailey et al. |
| 2003/0021533 A1 | 1/2003 | Ishikawa et al. |
| 2003/0095769 A1* | 5/2003 | Aikawa et al. ............... 385/127 |
| 2003/0138207 A1 | 7/2003 | Wang et al. |
| 2005/0175303 A1* | 8/2005 | Jang et al. ..................... 385/124 |
| 2005/0226584 A1 | 10/2005 | Williams et al. |
| 2006/0062534 A1* | 3/2006 | Aikawa et al. ............... 385/127 |
| 2006/0222306 A1 | 10/2006 | Homa et al. |
| 2006/0239627 A1* | 10/2006 | Gambirasio et al. .......... 385/123 |
| 2007/0065084 A1* | 3/2007 | Prasad et al. .................. 385/127 |
| 2007/0230860 A1 | 10/2007 | Kornreich et al. |
| 2007/0253668 A1 | 11/2007 | Pita et al. |
| 2008/0080823 A1 | 4/2008 | Gray et al. |
| 2008/0166097 A1* | 7/2008 | Hirano .......................... 385/127 |
| 2008/0273849 A1 | 11/2008 | Sanders et al. |
| 2008/0292256 A1 | 11/2008 | Homa |

OTHER PUBLICATIONS

Photosensitive Fiber. Fibercore Product Factnote. www.fibercore.com.

* cited by examiner

BEND INSENSITIVE OPTICAL FIBER WITH IMPROVED HYDROGEN RESISTANCE

BACKGROUND

Optical fiber sensors are often utilized to obtain various surface and downhole measurements, such as pressure, temperature, stress and strain. Examples of optical fiber sensors include optical fibers having a series of fiber Bragg gratings. The wavelength distribution from such gratings is affected by temperature and strain on the fiber, and thus such fibers can be used to measure temperature and strain, for example.

Some optical fiber sensors utilize cores doped with photosensitive materials. Photosensitive materials such as germanium are utilized to facilitate grating manufacture, but readily react with hydrogen at temperatures in excess of 100 C, which limits the performance in harsh environments such as those downhole. Furthermore, these materials are often heavily doped in the core to increase the numerical aperture as to improve the microbend resistance and macrobend resistance. An exemplary fiber includes a germanium doped silica core, a fluorine and phosphorous doped "matched cladding" and a pure silica outer cladding which is often the deposition tube in performs fabricated via Modified Chemical Vapor Deposition (MCVD).

Downhole environments are generally severe, and can expose fibers to conditions such as intense heat and pressure. When optical fibers such as germanium doped silica fibers are exposed to such an environment, attenuation losses can increase significantly. These losses are at least partly due to hydrogen losses in the fibers. For example, one type of loss, referred to herein as short wavelength edge (SWE)-induced loss, is associated with dopant (e.g., germanium) deficient-type defects along the fiber. Hydrogen atoms will bond to any open or weak bonds in the glass structure, such as to certain dopant atoms (e.g., Ge, Sn, Pb, Sb, B, P) in the vicinity of dopant-oxygen deficient centers, or to form SiOH and/or "dopant" OH. For germanium-doped fibers, for example, attenuation increases rapidly with increases in temperature.

An optical fiber with a pure silica core is often employed in downhole applications due to its inherent resistance to hydrogen induced attenuation at temperatures above 80 C. The pure silica core lacks the photosensitive materials preferred for standard grating fabrication processes at, for example, 248 nm or 193 nm.

Increases in photosensitive material concentration, such as germanium, increase the fiber sensors' sensitivity to hydrogen loss. Thus, high NA optical fibers having highly doped photosensitive cores, although having a relatively high NA and reduced sensitivity to micro and macrobends, exhibit high hydrogen induced loss, especially when exposed to downhole environments.

SUMMARY

An optical fiber includes: a core including a photosensitive material disposed therein, the core having a first index of refraction; a depressed cladding surrounding the core and having a second index of refraction that is lower than the first index of refraction; and an outer cladding surrounding the depressed cladding and having a third index of refraction that is higher than the depressed cladding.

An optical fiber includes: a core including a photosensitive material disposed therein, the core having a first index of refraction; and a cladding surrounding the core and having a second index of refraction that is lower than the first index of refraction An apparatus for estimating at least one parameter in a downhole environment includes: an optical fiber sensor configured to be disposed in a borehole and including an optical fiber, the optical fiber including a core having a first index of refraction and a photosensitive material disposed therein, and a depressed cladding surrounding the core and having a second index of refraction that is lower than the first index of refraction; at least one measurement unit disposed in the optical fiber; a light source configured to send an optical signal into the optical fiber; and a detector configured to receive a return signal generated by the at least one measurement unit and generate data representative of the at least one parameter.

Referring now to the drawings wherein like elements are numbered alike in the several Figures.

DETAILED DESCRIPTION

Figure 1:
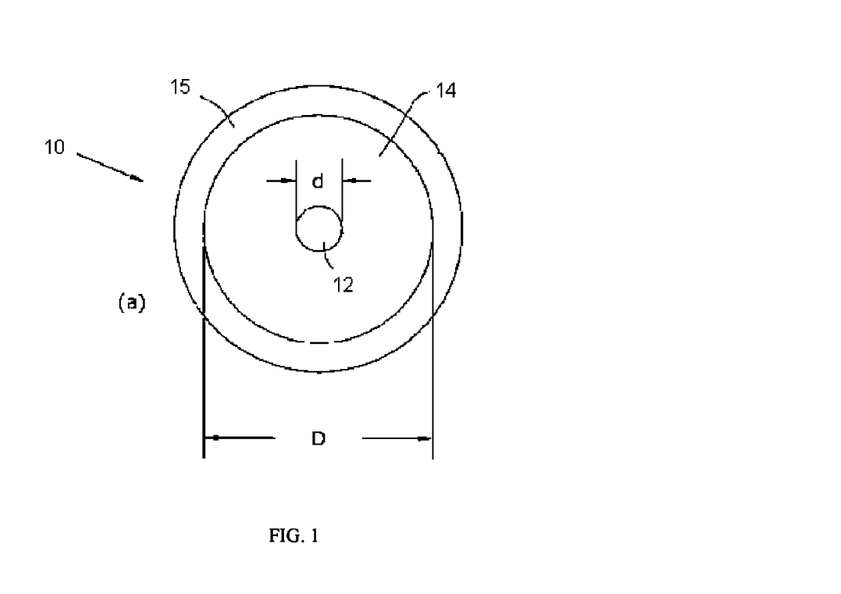
FIG. 1 is a front cross-sectional view of an embodiment of an optical fiber.
Figure 2:
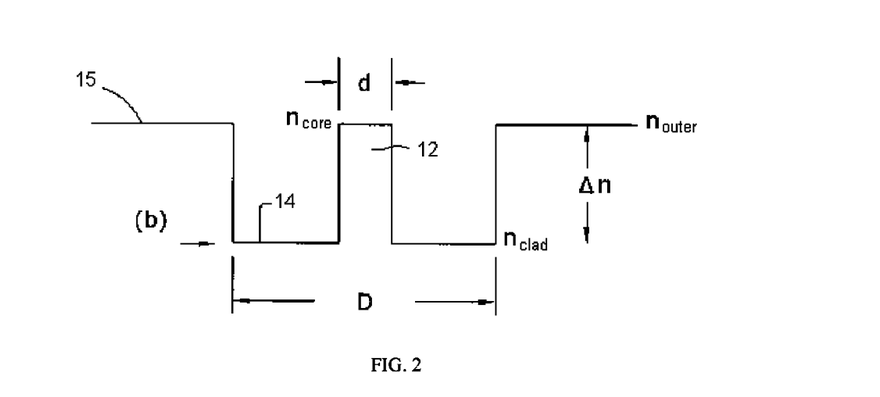
FIG. 2 depicts an exemplary index profile of the optical fiber of FIG. 1.

Referring to FIGS. 1 and 2, a cross-sectional view of an embodiment of an optical fiber 10 is illustrated and an associated refractive index profile is shown. In FIG. 1, the optical fiber 10 includes a photosensitive core 12 having a first index of refraction ("$n_{core}$") and a diameter "d" and a cladding 14 having a second index of refraction ("$n_{clad}$") having an outer diameter "D". The first index of refraction is greater than the second index of refraction, i.e., $n_{core} > n_{clad}$. In one embodiment, the optical fiber 10 is a depressed cladding or deeply depressed cladding optical fiber. A deeply depressed optical fiber is a generally a single mode optical fiber that has a cladding with a very low index of refraction relative to the core with an outer cladding with approximately the same index as the core. In one embodiment, a "depressed-cladding" optical fiber is an optical fiber in which the difference between $n_{core}$ and $n_{clad}$, referred to as "$\Delta n$", is at least about 0.008. The cladding 14 is, in one embodiment, doped with materials suitable to lower $n_{clad}$ relative to pure silica, and or the outer cladding, $n_{outer}$. The numerical aperture, NA, is defined as $NA = (n_{core}^2 - n_{clad}^2)^{1/2}$. In one embodiment, the numerical aperture (NA) of the optical fiber 10 is at least about 0.08.

In one embodiment, the core 12 is a single mode fiber (SMF) type core having a constant index of refraction along the radial axis of the core 12. The core 12 may be made from suitable optically conductive materials including glasses such as silica glass or quartz. The core 12, in one embodiment, is doped with one or more of various materials such as photosensitive materials, which have the effect of increasing or otherwise changing $n_{core}$ relative to the undoped material. Examples of such materials include germanium (Ge), tin (Sn), phosphorous (P), tantalum (Ta), titanium (Ti), lead (Pb), lanthanum (La), aluminum (Al), Gallium (Ga), antimony (Sb), and any other materials suitable for doping into glass or other core materials. In one embodiment, the core 12 is lightly doped with photosensitive material. In one embodiment, "lightly doped" material refers to material having a concentration of dopant sufficient to raise the refractive index of the material by about 0.0001 or less. For example, the dopant concentration is sufficient to increase $n_{core}$ by between about 0.0001 and about 0.04. In one example, the dopant concentration is sufficient to increase $n_{core}$ by between about 0.003 and 0.01. In one embodiment, the concentration of photosensitive material is reduced but includes a minimum concentration that allows for fiber Bragg grating or other measurement unit fabrication.

In one embodiment, to achieve an increased core index of refraction, the core is doped with a core dopant such as germanium or other index raising material in the range of between about 0.5 and about 15 weight percent (wt %). In one example, the core dopant concentration is between about 2.5 and about 10 wt % of the core.

The cladding 14 is a doped cladding layer including an optically conductive material such as silica glass that is doped with a dopant having the ability to lower $n_{clad}$ relative to the undoped material. Examples of such cladding dopants include fluorine and boron. The cladding 14 has a dopant concentration sufficient to result in an index difference relative to silica in the optical fiber 10 that is at least about –0.001. In one embodiment, the clad 14 is lightly doped with a cladding dopant to achieve a concentration of dopant sufficient to lower the refractive index of the clad material relative to pure silica by at least 0.001. For example, the dopant concentration is sufficient to decrease $n_{clad}$ by between about 0.001 and about 0.02. The dopant concentration may be, in one example, sufficient to increase $n_{clad}$ by between about 0.003 and 0.01.

In one embodiment, to achieve a reduced cladding index of refraction, the cladding is doped with a dopant such as fluorine or other index reducing material in the range of between about 0.03 wt % and about 5 wt %. For example, the cladding dopant concentration is between about 0.5 and about 3 wt % of the cladding.

Figure 3:
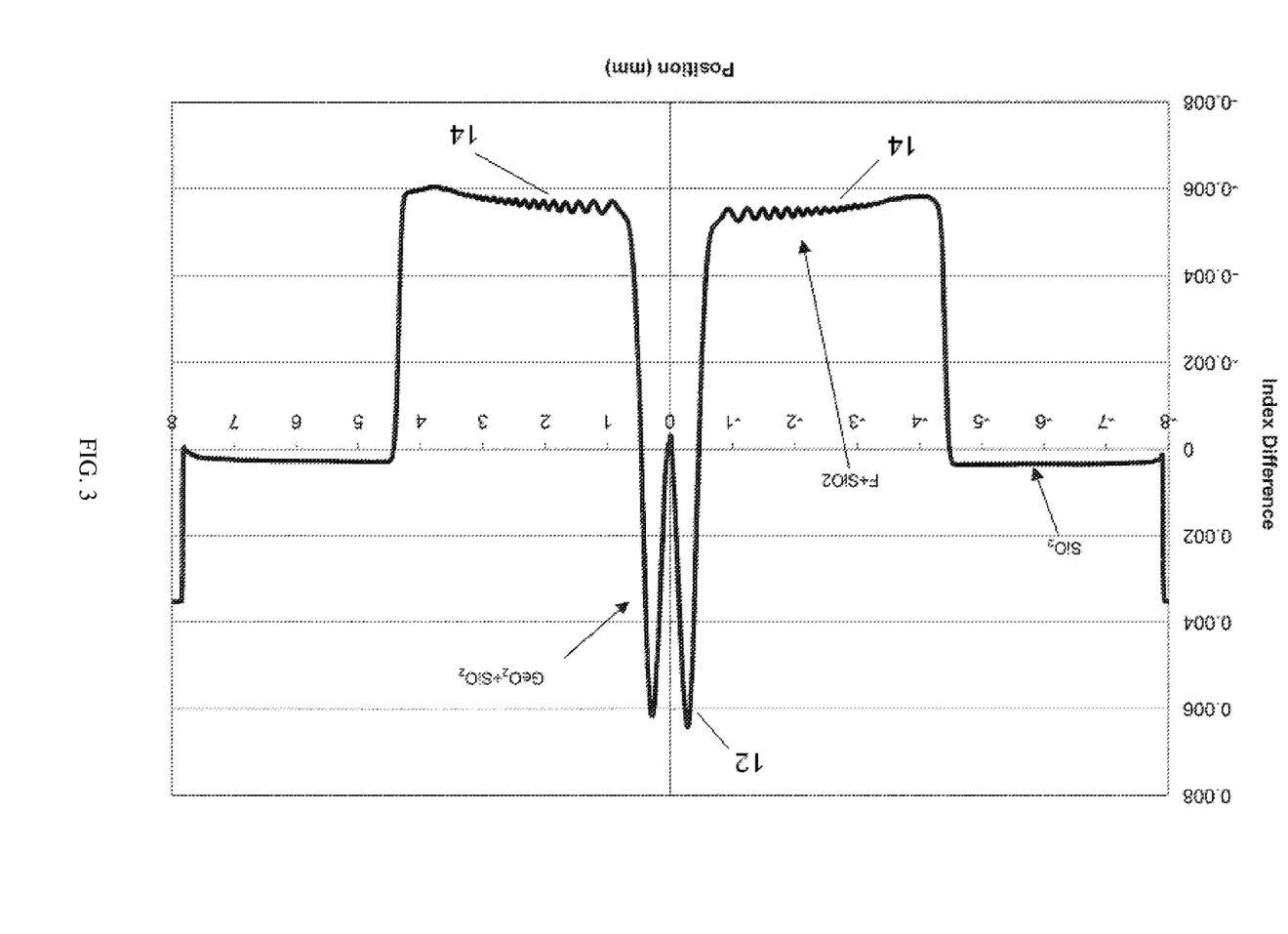
FIG. 3 depicts an exemplary index profile of an embodiment of an optical fiber.

A refractive index of an exemplary optical fiber 10 is shown in FIG. 3. As shown therein, the optical fiber 10 includes a silica ($SiO_2$) core doped with germanium ($GeO_2$). The core is doped with Ge so that the index difference (i.e., the difference between the doped core in comparison with an undoped silica core) is about 0.006 or less. The cladding is doped with fluorine (F) to reduce the index of refraction so that the index difference (i.e., the difference between the doped cladding in comparison with an undoped cladding) is between about 0.005 and 0.006. Accordingly, as shown in this example, the total index difference between the core and the cladding is between about 0.010 or more.

An example of the optical fiber 10 includes a single mode germanium-doped core 12, similar to the core of a typical communications fiber. The core 12 is a silica core lightly doped with germanium, e.g., having a germanium concentration of about 3 wt %. In one example, the germanium-doped core has a concentration of germanium sufficient to increase $n_{core}$ by about 0.0055 relative to undoped material. The cladding 14 includes a fluorine and/or boron doped silica cladding having sufficient dopant concentration to lower $n_{clad}$ to at least 0.001 less than pure silica.

The numerical aperture of the fiber in this example is in the 0.16-0.20 range while utilizing only half the germanium typically required to fabricate this design with a pure silica cladding. The fiber has improved hydrogen loss resistance, as well as improved microbend and macrobend resistance, and can be utilized in cable structures or other configurations that impart strain on the fiber, such as polyimide coatings and composite structures.

In one embodiment, the cladding 14 includes two cladding regions or layers referred to as an inner cladding 14 and an outer cladding 15. The outer cladding 15 surrounds the inner cladding 14, which in turn surrounds the core 12. The inner cladding has an index of refraction $n_{clad}$ that is less than $n_{core}$. The outer cladding has an index of refraction "$n_{outer}$" that is, in one embodiment, greater than $n_{clad}$. The outer cladding's $n_{outer}$ may be less than or at least approximately equal to $n_{core}$. In one embodiment, the cladding diameter D and the core diameter d are configured such that a ratio between the core and cladding diameters (D/d) is greater than 2. In one embodiment, the ration D/d is greater than 8.5.

Figure 4:
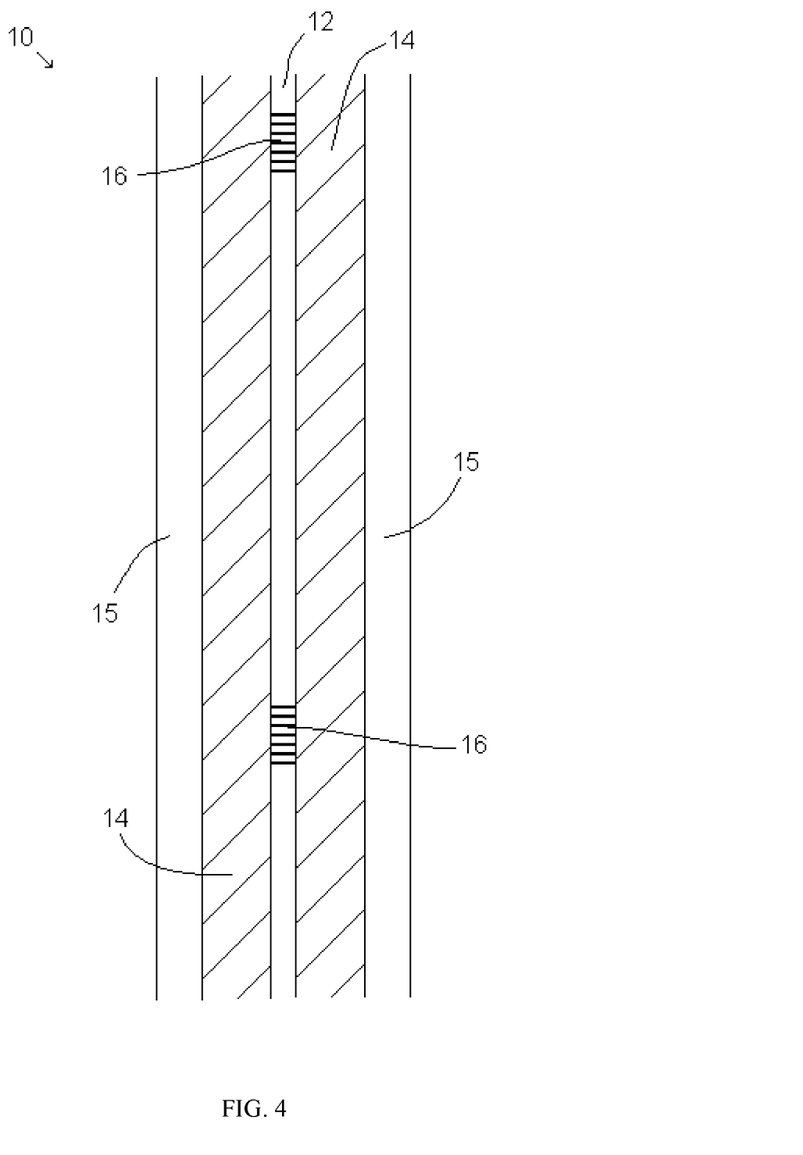
FIG. 4 is a side cross-sectional view of an embodiment of a measurement apparatus incorporating the optical fiber of FIG. 3.

Referring to FIG. 4, in one embodiment, the optical fiber 10 is configured as an optical fiber sensor. In this embodiment, the optical fiber 10 includes at least one measurement unit 16 disposed therein. For example, the measurement unit 16 is a fiber Bragg grating disposed in the core 12 that is configured to reflect a portion of an optical signal as a return signal, which can be detected and/or analyzed to estimate a parameter of the optical fiber 10 and/or a surrounding environment.

A fiber Bragg grating (FBG) is a permanent periodic refractive index modulation in the core of an optical fiber that extends along a selected length of the core, such as about 1-100 mm. A FBG reflects light within a narrow bandwidth centered at the Bragg wavelength "$\lambda_B$". The reflected Bragg wavelength $\lambda_B$ from an FBG change with changes in conditions around the fiber, such as temperature and pressure, sufficient to changes the effective refractive index seen by propagating light and/or the physical grating period of the FBG. By measuring the reflected Bragg wavelength $\lambda_B$, a FBG can be used as a sensor for measuring such conditions. FBGs can also be used as a pressure sensor by measuring the shift in Bragg wavelength caused by compression of the fiber.

The specific materials making up the core 12, cladding 14, such as photosensitive materials and dopants are not limited to those described herein. Any materials sufficient for use in optical fibers and/or suitable for affecting the refractive index may be used as desired. In addition, the diameters or sizes of the core 12 and the cladding 14 are not limited, and may be modified as desired or required for a particular design or application. Furthermore, the optical fiber 10 is not limited to the specific material or dopant concentrations described herein. The concentrations (which may be expressed as molar percentage, weight percentage or density) may be modified as needed to affect the index of refraction and numerical aperture characteristics described herein.

Figure 5:
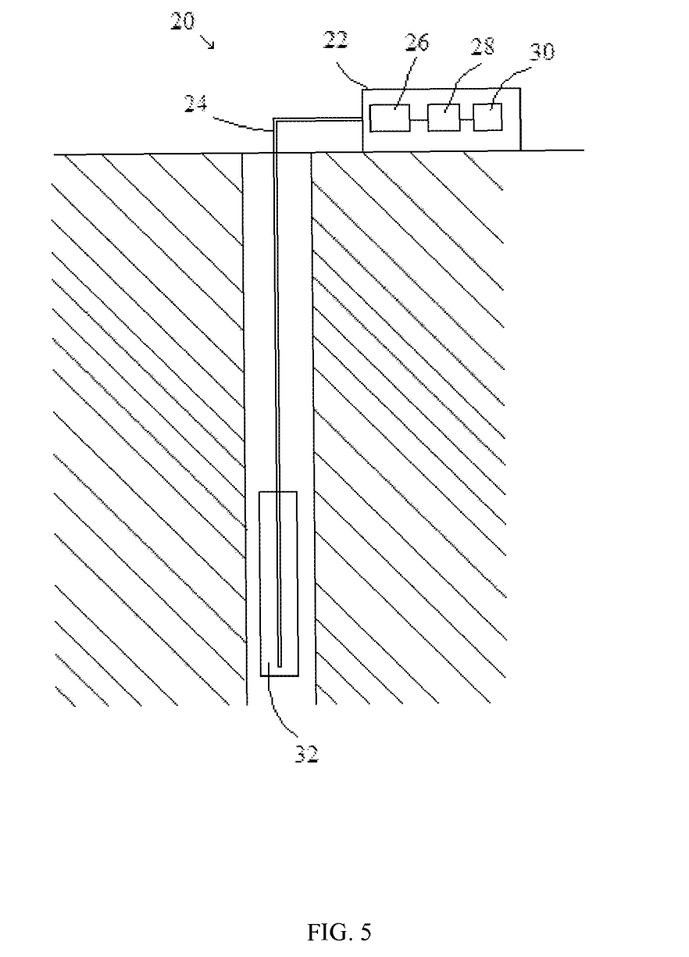
FIG. 5 depicts a downhole measurement apparatus incorporating the optical fiber of FIG. 3.

An example of an application of the optical fiber 10 and/or optical fiber sensor is shown in FIG. 5, in which a downhole measurement apparatus 20 is illustrated. The downhole measurement apparatus 20 is configured to measure various downhole parameters, such as strain, stress, temperature and pressure. In one embodiment, the apparatus 20 includes the optical fiber 10, which is configured as a strain sensing optical fiber sensor. Although the optical fiber 10 described herein is described as a strain sensing fiber, it may be utilized to measure any of various downhole and surface parameters or be utilized in other capacities, such as communication.

The apparatus 20 includes a surface unit 22 and at least one optical fiber sensor 24. The optical fiber sensor 24 includes the optical fiber 10. In one embodiment, the optical fiber sensor 24 includes a plurality of measurement units 16 such as fiber Bragg gratings (FBGs) distributed along a length of the optical fiber 10.

The surface measurement unit 22 includes a tunable laser 26, a detector 28 and a processing unit 30. The detector 28 may be any suitable type of photodetector such as a diode assembly. The detector 28 is configured to receive return signals reflected from the measurement units (e.g., FBGs) 16 and generate measurement data.

The optical fiber sensor 24 is configured to be disposed in a borehole 32 and extend along a desired length of the borehole 32. Exemplary parameters that can be measured using the optical fiber sensor include temperature, strain, pressure, position, shape and vibration.

In one embodiment, the optical fiber sensor 24 is disposed on or in relation to a carrier or housing 32, such as a drill string segment, downhole tool or bottomhole assembly. For example, multiple fiber optic sensors 24 can be incorporated into a sand screen 24 disposed downhole to monitor strain and acquire a three-dimensional deformation image of the screen 24. As described herein, "borehole" or "wellbore" refers to a single hole that makes up all or part of a drilled well. In addition, it should be noted that "carrier" as used herein, refers to any structure suitable for being lowered into a wellbore or for connecting a drill or downhole tool to the surface, and is not limited to the structure and configuration described herein. Examples of carriers include casing pipes, wirelines, wireline sondes, slickline sondes, drop shots, downhole subs, BHA's, drill string inserts, modules, internal housings and substrate portions thereof.

The apparatus 20 may be used in conjunction with methods for estimating various parameters of a borehole environment and/or the apparatus 20. For example, a method includes disposing the optical fiber sensor 24 and/or the carrier 32 downhole, emitting a measurement signal from the laser 26 and propagating the signal through the optical fiber 10. The Bragg gratings or other measurement units 16 reflect a portion of the signal back to the surface unit 22 through the optical fiber 10. The wavelength of this return signal is shifted relative to the measurement signal due to parameters such as strain and temperature. The return signal is received by the surface unit 22 and is analyzed to estimate desired parameters.

Figure 6:
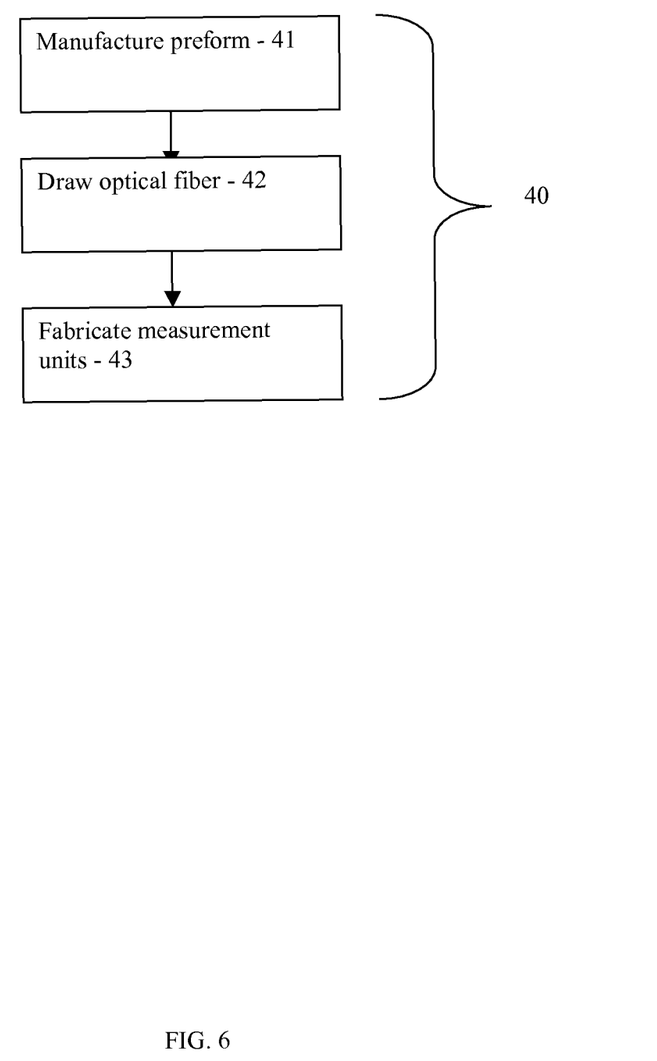
FIG. 6 is a flow chart illustrating an exemplary method of manufacturing an optical fiber.

FIG. 6 illustrates a method 40 of manufacturing the optical fiber 10. The method 40 includes one or more stages 41-46. In one embodiment, the method 40 includes the execution of all of stages 41-46 in the order described. However, certain stages may be omitted, stages may be added, or the order of the stages changed.

In the first stage 41, a photosensitive optical fiber preform is manufactured utilizing any of a variety of suitable methods. Such methods include deposition methods such as chemical vapor deposition (CVD), modified chemical vapor deposition (MCVD), plasma chemical vapor deposition (PCVD), vapor-phase axial deposition (VAD) and outside vapor deposition (OVD). In one embodiment, the preform includes a preform core having a first concentration of a photosensitive material such as germanium. The preform includes a preform cladding layer having a second concentration of at least one dopant such as fluorine and/or boron. In one example, the preform core is a lightly doped core including an optically conductive material, such as silica, lightly doped with germanium (e.g., less than or equal to 10% molar weight).

In one embodiment, the preform (and subsequent optical fiber) includes core, cladding and outer cladding regions. The core has an increased index of refraction relative to silica due to index raising dopants such as germanium. The cladding has a decreased index of refraction relative to silica due to index lowering dopants such as boron and fluorine. The outer cladding may be pure silica or doped to raise the index of refraction. In one example, the outer cladding is formed from the preform tube used in an MCVD process. Accordingly, for the preform and subsequent optical fiber in this embodiment, $n_{core} > n_{clad}$, $n_{core} > n_{outer}$, and $n_{outer} > n_{clad}$.

In one embodiment, the preform (and subsequent optical fiber) includes a core and a cladding region. The preform may be manufactured in this embodiment, by a method such as OVD or VAD. The core includes a photosensitive material that increases the index of refraction, and the cladding has a decreased index of refraction relative to silica due to index lowering dopants. The cladding is doped such that the index of refraction is lowered substantially such that a lower dopant concentration is required in the core to raise the index and achieve the same NA as a fiber lacking a cladding dopant.

In the second stage 42, a length of optical fiber is drawn from the preform.

In the third stage 43, measurement units such as fiber Bragg gratings (FBGs) are fabricated in the optical fiber. The measurement units may be fabricated either during fiberization, such as on a fiber draw tower, or after fiberization. Exemplary methods of fabricating the FBG include etching and ultraviolet (UV) writing. For example, FBGs can be created in a photosensitive fiber (i.e. a fiber including a photosensitive dopant, such as germanium) by transversely illuminating the fiber with a periodic interference pattern generated by ultraviolet (UV) laser light.

The optical fiber design described herein is suitable for any number of measurement devices. For example, the optical fiber 10 is well suited for use as a Bragg grating optical fiber sensor. The optical fiber design provides a balance between the photosensitivity required for grating manufacture, hydrogen resistance, and microbend and macrobend resistance.

The optical fibers, apparatuses and methods described herein provide various advantages over existing methods and devices. For example, the optical fibers described herein exhibit a large NA while including a reduced amount of photosensitive dopant, and while preserving required photosensitivity levels, as well as hydrogen and bend resistance. For example, the optical fibers described herein exhibit a high Δn without the need to increase germanium doping levels, resulting in greater hydrogen resistance than prior art photosensitive fibers. This is advantageous over typical photosensitive fibers that require larger amounts of germanium to achieve high NAs, which increases the susceptibility to hydrogen loss.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. An optical fiber comprising:
   a core including a refractive index-raising photosensitive material disposed therein, the core having a first index of refraction, the core having a concentration of the photosensitive material, the concentration of the photosensitive material being substantially equal to the lowest concentration that allows fabrication of the fiber Bragg gratings by illuminating the photosensitive material with electromagnetic radiation;
   a depressed cladding surrounding the core and having a second index of refraction that is lower than the first index of refraction; and
   an outer cladding surrounding the depressed cladding and having a third index of refraction that is higher than the depressed cladding.

2. The optical fiber of claim 1, wherein the numerical aperture is greater than 0.10.

3. The optical fiber of claim 1, wherein a ratio of a diameter "D" of the inner cladding and a diameter "d" of the core is at least one of: greater than 2 and greater than 8.5.

4. The optical fiber of claim 1, wherein a difference between the first index of refraction and the second index of refraction is at least one of: greater than at least 0.003 and between about 0.002 and about 0.06.

5. The optical fiber of claim 1, wherein the optical fiber is configured as an optical fiber sensor and includes at least one measurement unit disposed therein.

6. The optical fiber of claim 1, wherein the core includes at least one core dopant configured to raise the first index of refraction.

7. The optical fiber of claim 6, wherein a concentration of the at least one core dopant is at least one of: i) sufficient to raise the first index of refraction relative to pure silica by an amount between about 0.001 and about 0.006, and ii) between about 0.03 and 5 mol percent of the core.

8. The optical fiber of claim 6, wherein the cladding includes at least one cladding dopant configured to lower the second index of refraction relative to pure silica.

9. The optical fiber of claim 8, wherein the at least one cladding dopant has a concentration sufficient to lower the second index of refraction so that a difference between the first index of refraction and the second index of refraction is at least about 0.001.

10. The optical fiber of claim 8, wherein the at least one core dopant has a first concentration sufficient to raise the first index of refraction relative to pure silica to a value between about 0.001 and about 0.04, and the at least one cladding dopant has a second concentration sufficient to lower the second index of refraction relative to pure silica to a value between about 0.001 and about 0.02.

11. The optical fiber of claim 8, wherein the at least one cladding dopant is selected from at least one of fluorine and boron.

12. The optical fiber of claim 8, wherein the cladding is co-doped with at least one dopant selected from at least one of germanium, tin, phosphorous, tantalum, titanium, lead, lanthanum, aluminum, gallium and antimony.

13. An optical fiber comprising:
    a core including a refractive index-raising photosensitive material disposed therein, the core having a first index of refraction, the core having a minimum concentration of the photosensitive material, the concentration of the photosensitive material being substantially equal to the lowest concentration that allows fabrication of the fiber Bragg gratings by illuminating the photosensitive material with electromagnetic radiation; and
    a cladding surrounding the core and having a second index of refraction that is lower than the first index of refraction, the cladding including at least one dopant configured to lower the second index of refraction.

14. The optical fiber of claim 1, wherein the optical fiber is configured as an optical fiber sensor and includes at least one measurement unit disposed therein.

15. The optical fiber of claim 13, wherein the core includes at least one core dopant configured to raise the first index of refraction.

16. The optical fiber of claim 13, wherein the cladding includes at least one dopant having a concentration sufficient to lower the second index of refraction so that a difference between the first index of refraction and the second index of refraction is at least about 0.001.

17. The optical fiber of claim 13, wherein the core includes at least one core dopant having a first concentration sufficient to raise the first index of refraction relative to pure silica to a value between about 0.001 and about 0.04, and the at least one cladding dopant has a second concentration sufficient to lower the second index of refraction relative to pure silica to a value between about 0.001 and about 0.02.

18. An apparatus for estimating at least one parameter in a downhole environment comprising:
    an optical fiber sensor configured to be disposed in a borehole and including an optical fiber, the optical fiber including a core having a first index of refraction and a refractive index-raising photosensitive material disposed therein, and a depressed cladding surrounding the core and having a second index of refraction that is lower than the first index of refraction, the core having a minimum concentration of the photosensitive material, the concentration of the photosensitive material being substantially equal to the lowest concentration that allows fabrication of the fiber Bragg gratings by illuminating the photosensitive material with electromagnetic radiation;
    at least one measurement unit disposed in the optical fiber;
    a light source configured to send an optical signal into the optical fiber; and
    a detector configured to receive a return signal generated by the at least one measurement unit and generate data representative of the at least one parameter.

* * * * *